(12) United States Patent
Alshehri et al.

(10) Patent No.: US 12,690,947 B2
(45) Date of Patent: Jul. 28, 2026

(54) DENTAL HAND TOOL HAVING DIFFERENT IMPLEMENTS FOR RETRIEVING MATERIAL FROM A CAVITY LOCATED IN A PATIENT'S TOOTH

(71) Applicant: KING SAUD UNIVERSITY, Riyadh (SA)

(72) Inventors: Mohammed Abdullah Alshehri, Riyadh (SA); Mohammed Saeed Alghamdi, Riyadh (SA); Adnan Mohammed Shouki Bazarbashi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/964,943

(22) Filed: Dec. 2, 2024

(65) Prior Publication Data

US 2026/0151211 A1      Jun. 4, 2026

(51) Int. Cl.
A61C 3/00          (2006.01)

(52) U.S. Cl.
CPC ...................................... A61C 3/00 (2013.01)

(58) Field of Classification Search
CPC ........... A61C 3/00; A61C 19/043; A61C 5/42; A61C 3/08; A61C 15/048; A61C 15/00
See application file for complete search history.

(56) References Cited

U.S. PATENT DOCUMENTS

| | | | | |
|---|---|---|---|---|
| 322,265 | A | * | 7/1885 | Donaldson ............... A61C 5/42 |
| | | | | 433/102 |
| 3,910,293 | A | * | 10/1975 | Lemelson .............. A61C 15/02 |
| | | | | 132/329 |
| 4,824,370 | A | * | 4/1989 | Laurichesse ............. A61C 5/42 |
| | | | | 433/102 |
| 4,832,061 | A | | 5/1989 | Hwang |
| 5,624,259 | A | | 4/1997 | Heath et al. |
| 6,640,815 | B1 | | 11/2003 | Rosen |
| 6,705,865 | B1 | * | 3/2004 | Szymaitis ................ A61C 3/00 |
| | | | | 433/141 |

(Continued)

FOREIGN PATENT DOCUMENTS

| | | | |
|---|---|---|---|
| KR | 100853476 | B1 | 8/2008 |

OTHER PUBLICATIONS

Hu-Friedy Expro #23/Williams Color-Coded published on Apr. 20, 2024.

*Primary Examiner* — Eric J Rosen
*Assistant Examiner* — Luis Ruiz Martin
(74) *Attorney, Agent, or Firm* — Nath, Goldberg & Meyer; Joshua B. Goldberg

(57)          ABSTRACT

A dental apparatus includes a handle, a first dental implement and a second dental implement. The first and second dental implements extend from different portions of a body of the handle. The first dental implement may include an elongated member that is straight, a spear extending from a distal end of the straight elongated member, and a barb connected to the body of the first elongated member, adjacent to the second end of the body of the first elongated member. The second dental implement may include a cone-shaped member having a plurality of nubs protruding from an exterior of the cone-shaped member and pointing generally toward an opening of a dental cavity when the cone-shaped member is inserted in the cavity.

16 Claims, 2 Drawing Sheets

(56)  References Cited

U.S. PATENT DOCUMENTS

| 7,249,948 | B2 | 7/2007 | Hill | |
|---|---|---|---|---|
| D922,577 | S | 6/2021 | Ayers | |
| 2006/0029906 | A1 | 2/2006 | Hill | |
| 2007/0031788 | A1* | 2/2007 | Chao | A61C 3/00 |
| | | | | 433/144 |
| 2014/0113246 | A1 | 4/2014 | Jaramillo | |
| 2016/0135932 | A1* | 5/2016 | Butz | A61C 15/00 |
| | | | | 132/329 |
| 2021/0361398 | A1* | 11/2021 | Wink | A61C 3/00 |
| 2023/0082568 | A1* | 3/2023 | Yu | A61C 15/00 |
| | | | | 15/143.1 |

* cited by examiner

DENTAL HAND TOOL HAVING DIFFERENT IMPLEMENTS FOR RETRIEVING MATERIAL FROM A CAVITY LOCATED IN A PATIENT'S TOOTH

TECHNICAL FIELD

The present disclosure relates to a dental apparatus, and more particularly, to a hand tool configured to be used by a dentist to retrieve material from an elongated cavity located in a patient's tooth.

DISCUSSION OF THE RELATED ART

Dental hand tools, as contrasted from dental power tools, are used for performing various dental procedures such as probing, removing decayed tooth material during a filling procedure, etc. Dental hand tools have a limited use in procedures that require reaching inside of a long, narrow, and potentially non-linear cavity inside of a patient's tooth. More specifically, known dental hand tools are generally not suited to retrieving material from long and narrow dental cavities.

SUMMARY

The present disclosure relates to a dental hand tool having a pair of implements that can be configured to remove material from long, narrow and non-linear cavities in a patient's tooth, whether the tooth is natural or prosthetic.

A first one of the implements has a long and elongated metallic body, with a hump in its profile, and a straight portion with a spear and a barb at the end of the straight portion. The straight portion is long and slender, and can fit into long and narrow holes in a patient's tooth. The length and slenderness of the straight portion allows bending when the dental cavity is non-linear. The spear facilitates insertion of the implement in the hole and the barb can be used to engage with (e.g., catch, connect, be attached to or otherwise grab) material in the hole (or cavity). Once engaged, the first dental implement can be retrieved from the dental cavity to remove the engaged material from the cavity.

The hump facilitates insertion of the first dental implement in the patient's mouth.

The second implement includes a long, narrow and slender metallic body portion at the end thereof. The second implement includes a plurality of nubs, or protrusions, that extend from the exterior surface of the metallic body portion of the second implement. The nubs are elongated metallic structures that point away from the end of the metallic body portion that enters the dental cavity first. The nubs can be arranged in a spiraling path along the length of the metallic body portion of the second implement. The nubs can be used to engage with material located in the dental cavity. The nubs may be dull (e.g., not sharp), to avoid or at least substantially reduce damaging dental tissue in the cavity.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
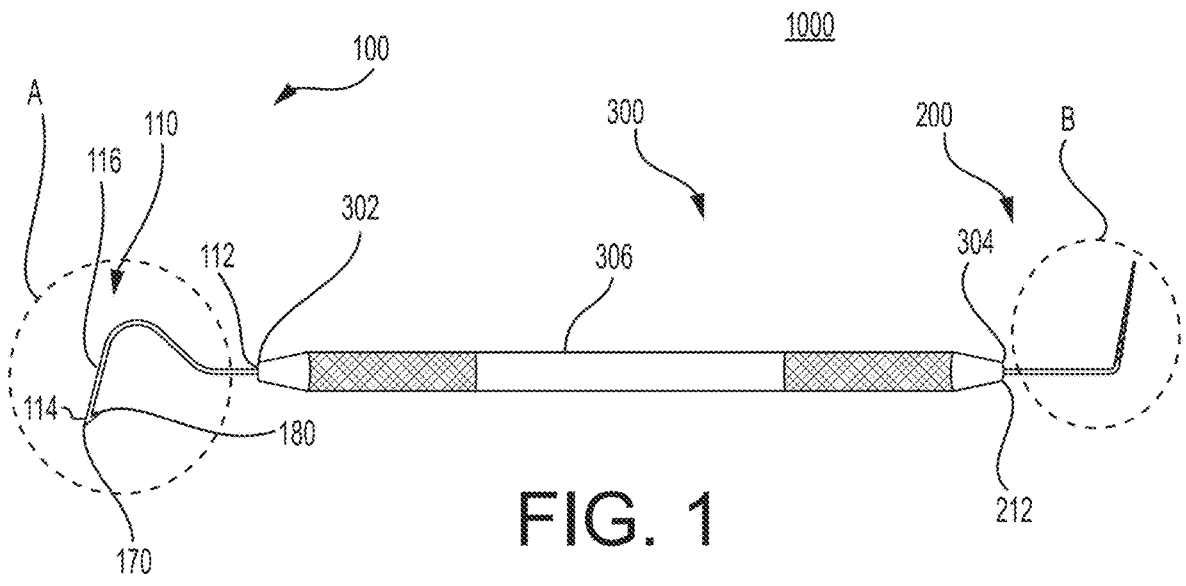
FIG. 1 is a side view illustrating a dental tool according to an embodiment of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

FIGS. 1-4 illustrate dental apparatus 1000 according to an embodiment of the present subject matter. The dental apparatus 1000 may be referred to as an "apparatus" for brevity purposes and is considered to be a dental hand tool.

Referring to FIG. 1, the apparatus 1000 includes a handle 300, a first dental implement 100 extending from the handle 300, and a second dental implement 200 extending from the handle 300 at an end opposite to first dental implement 100.

The handle 300, the first dental implement 100 and the second dental implement 200 may be made of a metal that is considered safe for coming in contact with bodily tissue, durable, and able to withstand repeated sterilization without oxidizing. The metal may include, for non-limiting example, stainless steel (e.g., surgical grade stainless steel), titanium (e.g., surgical grade titanium), etc.

Referring to FIG. 1, the handle 300 has a first end 302, a second end 304 opposite to the first end 302, and a handle body 306 extending between the first and second ends 302, 304.

The first dental implement 100 may extend from the first end 302 of the handle body 306. The second dental implement 200 may extend from the second end 304 of the handle body 306.

Stated otherwise, the first dental implement 100 extends from a first portion of the handle body 306 (e.g., a first end portion of the handle body 306), and the second dental implement 200 extends from a second portion of the handle body (e.g., a second end portion of the handle body 306).

The first and second dental implements 100, 200 may be structurally different from one another.

Figure 2:
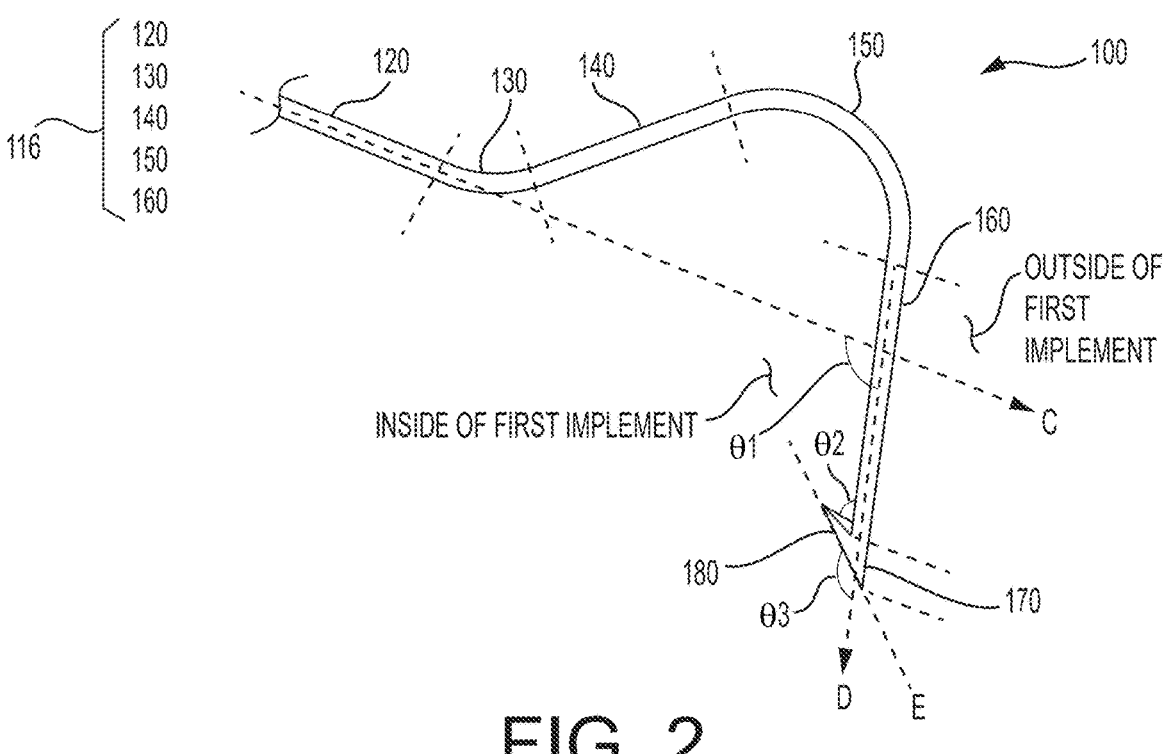
FIG. 2 is a magnified perspective view illustrating a portion A of the dental tool of FIG. 1.

Referring to FIGS. 1 and 2, the first dental implement 100 includes a first elongated member 110, a spear 170 and a barb 180.

The first elongated member 110 may have a first end 112 connected to the first end 302 of the handle body 300, a second end 114 opposite to the first end 112, and a body 116 extending between the first and second ends 112, 114. The first elongated member 110 may be, for example, a tubular metallic member. However, the first elongated member 100 may also have other shape(s), when desired. As an example, the first elongated member 110 may have a circular cross-section (i.e., a tubular structure), an elliptical cross-section, an oval cross-section, a polygonal cross section, or an irregular cross section including curved and straight portions.

Referring to FIG. 2, the body 116 of the first elongated member 110 may include a plurality of curved body portions and a plurality of straight body portions extending between the first and second ends 112, 114 of the first elongated member 110.

The plurality of curved body portions and the plurality of straight body portions may include a first straight body portion 120, a second curved body portion 130, a third straight body portion 140, a fourth curved body portion 150 and a fifth straight body portion 160 sequentially arranged along a length of the first elongated member 110.

As more clearly illustrated in FIG. 2, the second curved body portion 130, the third straight body portion 140, the fourth curved body portion 150 and a portion of the fifth straight body portion 160 form a hump (e.g., a hump over the first straight body portion 120) when the first dental implement 100 is oriented as illustrated in FIG. 2. The hump facilitates access of the first dental implement 100 in a patient's mouth.

The first body portion 120 may extend between the second body portion 130 and the first end 302 of the handle body. The fifth body portion 160 extends between the spear 170 and the fourth body portion 140.

As illustrated in FIG. 2, the plurality of curved body portions 130, 150 may be alternatively arranged with the straight body portions 120, 140, 160.

Referring to FIG. 2, first imaginary axis C extends in a length direction of the first body portion 120, and a second imaginary axis D extends in a length direction of the fifth body portion 160. A first angle $\Theta 1$ is formed between a portion of the first imaginary axis C that extends on an inside of the first dental implement 100 and a portion of the second imaginary axis D that extends between an intersection of the first and second imaginary axes C, D and the spear 170. The first angle $\Theta 1$ can range from about 90 degrees to about 135 degrees. For example, the first angle $\Theta 1$ can be about 90 degrees or can be an obtuse angle.

The spear 170 may extend from the second end 114 of the body 116 of the first elongated member 110. For example, the spear 170 may be directly connected to the fifth body portion 160 at the second end 114 of the body 116. The spear 170 may extend along the second imaginary axis D. The spear 170 may taper to a point in a direction away from the second end 114 of the body 116.

Referring to FIG. 2, the barb 180 is connected to the body 116 of the first elongated member 110, adjacent to the second end 114 of the body 116 of the first elongated member 110. The barb 180 may be connected to the fifth body portion 160. The barb 180 may extend from the body 116 of the first elongated member 110 at an acute angle relative to the body 116. For example, the barb 180 may extend at a second acute angle $\Theta 2$ relative to the fifth straight body portion 160. In addition, the barb 180 may extend at a third obtuse angle $\Theta 3$ relative to the spear 170.

The barb 170 may taper to a point in a direction away from the body 116 of the first elongated member 110.

Referring to FIG. 2, the spear 170 and the barb 180 may be connected to one another. A first portion of the spear 170 can be connected to a first portion of the barb 180, and an exterior of the first portion of the spear 170 and an exterior of the first portion of the barb 180 can extend along a same imaginary line E, as illustrated in FIG. 2.

Due to the shape of the first dental implement 100, the fifth body portion 160 can be inserted in a long and narrow cavity in a patient's tooth, whether the tooth is natural or prosthetic. The long and slender shape of the fifth body portion 160 allows for some degree of bending, which enables the fifth body portion 160 to conform to the shape of a dental cavity that may be non-linear (e.g., a bent or curved root canal). The barb 180 can be used to engage with material in a dental cavity such that the material can be removed from the cavity by retrieving the fifth body portion 160 from the cavity. The handle 300 can be manipulated (e.g., rotated) to assist the barb 180 in engaging with the material inside of the cavity that a dentist wishes to remove.

Figure 3:
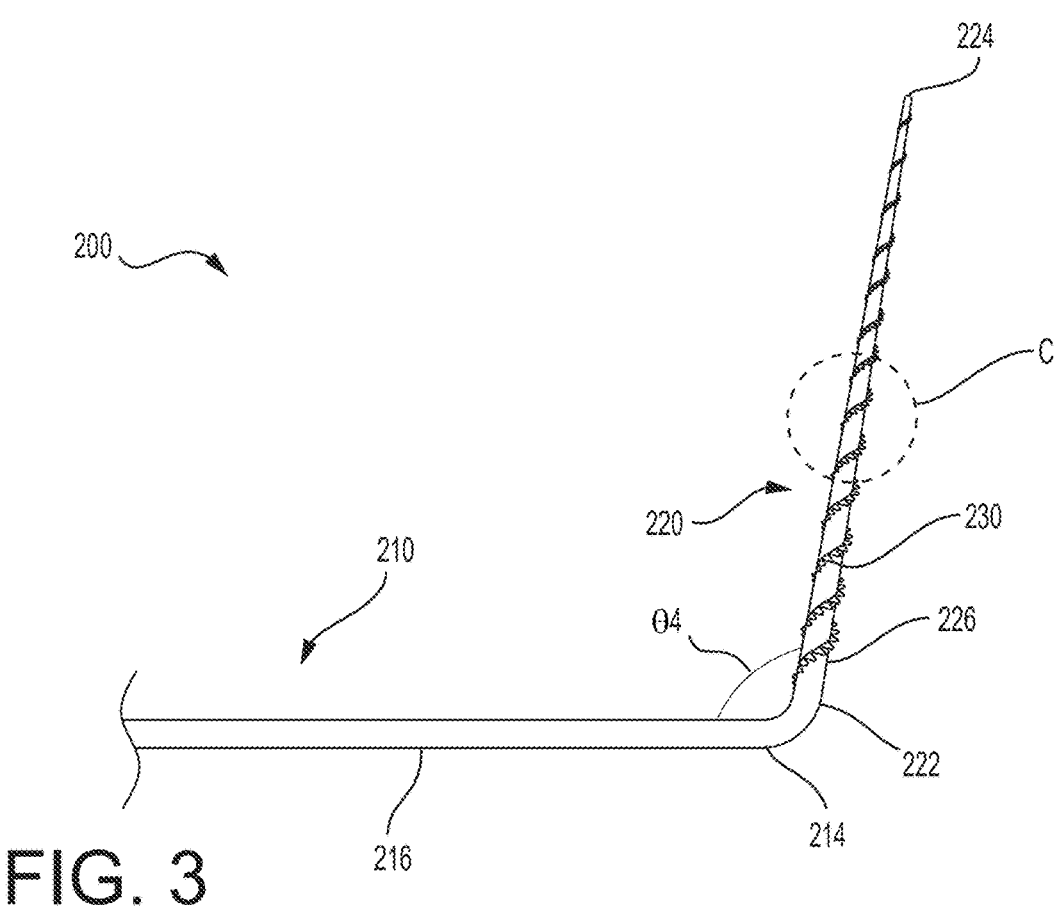
FIG. 3 is a magnified side view illustrating a portion B of the dental tool of FIG. 1.

Referring to FIGS. 1 and 3, the second dental implement 200 includes a first elongated member 210 and a second elongated member 220 connected to the first elongated member 210.

Referring to FIG. 3, the first elongated member 210 may include a first end 212 connected to the second end 304 of the handle body 306, a second end 214 opposite to the first end 212, and a body 216 extending between the first and second ends 212, 214. The first elongated member 210 may have a cross-section as described in this specification with reference to the first elongated member 110 of the first implement 100.

The second elongated member 220 includes a first end 222 connected to the second end 214 of the first elongated member 210, a second end 224 opposite to the first end 222, and a body 226 extending between the first and second ends 222, 224. The body 226 of the second elongated member 220 becomes narrower in a direction toward the second end 224. The body 226 may be straight.

The first and second elongated members 210 and 220 of the second dental implement 200 are illustrated in FIG. 3 as being joined by a relatively short and curved component of the second dental implement 200. Alternatively, the first and second elongated member 210, 220 may be directly connected to one another.

Referring to FIG. 3, a fourth angle Θ4 is formed between the first elongated member 210 and the second elongated member 220 of the second dental implement 200. The fourth angle Θ4 can be about 90 degrees or greater than 90 degrees (e.g., an obtuse angle). As an example, the fourth angle Θ4 can range from about 90 degrees to about 135 degrees.

As illustrated in FIG. 3, the second elongated member 220 may have a generally conical shape. Stated otherwise, the second elongated member 220 may be conical. For example, the body 226 of the second elongated member 220 may have a circular cross-section that decreases in size in a direction toward the second end 224. In addition, the body 226 of the second elongated member 220 may be pointed or rounded at the second end 224.

Referring to FIG. 3, the second dental implement 200 includes a plurality of nubs 230. The nubs 230 are protrusions that extend from an exterior of the body 226 of the second elongated member 220 of the second dental implement 200.

Figure 4:
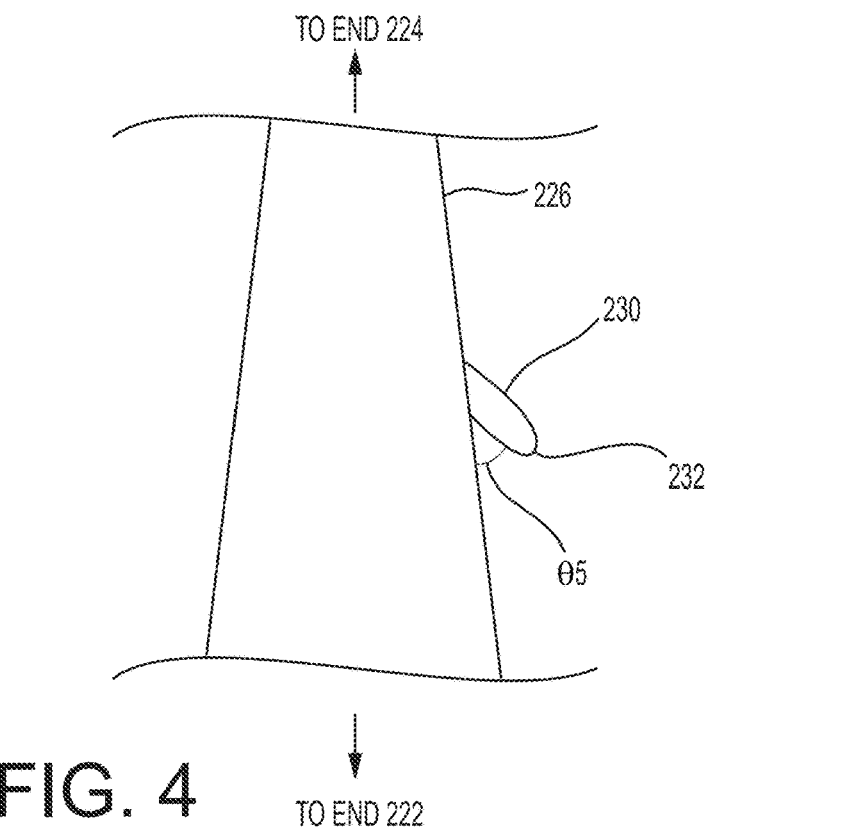
FIG. 4 is a magnified view illustrating a portion C of the dental tool of FIG. 3.

FIG. 4 illustrates a single numb 230 of the plurality of nubs 230 for convenience of illustration. As more clearly illustrated in FIGS. 3 and 4, the nubs 230 extend in a direction away from the second end 224 of the body 226.

As illustrated in FIGS. 3 and 4, each nub 230 of the plurality of nubs 230 is a three-dimensional structure having a U-like shape, a V-like shape, or a triangular shape in profile (or side view). More generally, each nub 230 may have a three-dimensional structure that becomes smaller in a direction away from the exterior of the body 226.

Referring to FIG. 3, the plurality of nubs 230 is arranged along a path that spirals (or coils) on the exterior of the body 226 between the first and second ends 222, 224.

As more clearly illustrated in FIG. 4, each nub 230 of the plurality of nubs 230 may have a blunt exterior periphery. For example, a peripheral edge 232 of the nubs 230 is blunt or rounded.

In addition, and with reference to FIG. 4, each nub 230 may protrude from an exterior of the body 226 at a fifth acute angle Θ5 (which can range from more than about 0 degrees to about 90 degrees) relative to the exterior surface of the body 226, in the direction away from the second end 224 of the body 226 of the second elongated member 200.

Referring to FIG. 3, a size of individual nubs 230 included in the plurality of nubs 230 may decrease along the path that spirals on the exterior of the body 226 in a direction toward the second end 224. Stated otherwise, the nubs 230 may become smaller in size along the spiral path toward the second end 224.

Due to the shape of the second dental implement 200, and more particularly, due to the shape of the body 226 of the second elongated member 220 and due to the shape and arrangement of the plurality of nubs 230, the second dental implement 200 can be inserted in a long and narrow cavity in a patient's tooth, whether the tooth is natural or prosthetic. The long and slender shape of the second elongated member 220 enables the second elongated member to enter long dental cavities, and to bend to conform to the shape of a dental cavity that may be non-linear (e.g., a bent or curved root canal).

The backward-facing nubs 230 (e.g., the nubs 230 point generally upwardly toward the outlet of a dental cavity when inserted in the dental cavity. The configuration of nubs 230 enables the nubs 230 to engage with material in the dental cavity. The handle 300 can be manipulated (e.g., rotated) to assist the second elongated member 220 with the numbs 230 in engaging with a material inside of the cavity that a dentist wishes to remove.

The engaged material can be removed from the dental cavity by retrieving the second dental implement 200 from the dental cavity. The edge 232 of the nubs 230 is rounded or blunted to reduce abrasion on the inner sidewall of the dental cavity will still securely engaging material that a dentist wishes to remove from the dental cavity.

The material that a dentist can use the apparatus 1000 of the present subject matter to remove from a dental cavity can be, for example, cotton (e.g., a cotton layer or cotton ball previously inserted in a dental cavity), material that is perhaps best described as being gooey (e.g., viscous, rubber-like material), which can have a sandy (or grainy) texture or a non-grainy or smooth texture, dental polytetrafluoroethylene (PTFE) tape (which was previously inserted in the dental cavity) a dental material (e.g., dental pulp, dental root material, etc.).

Depending on the consistency of the material that a dentist wishes to remove from a long and narrow dental cavity, the first dental implement 100 may be more suitable for removing the dental material from the cavity than the second dental implement 200, or vice-versa. However, the combination of the first and second dental implements 100 and 200 in the same apparatus 1000 enables a dentist to remove virtually any type of material present in a long and narrow dental cavity by using the apparatus 1000.

A method of performing a dental procedure, by using the apparatus 1000, is described below.

A method of performing a dental procedure includes obtaining the dental apparatus 1000, inserting one selected from the group consisting of the first and second dental implements 100, 200 in an elongated cavity, the elongated cavity extending inside of a natural or prosthetic tooth located in a mouth of a dental patient, manipulating the handle body 306 of the dental apparatus 1000 to cause the selected one from the group consisting of the first and second dental implements 100, 200 to engage with dental tissue or dental material present in the elongated cavity, and retrieving the selected one from the group consisting of the first and second dental implements 100, 200, engaged with the dental tissue or dental material, from the elongated cavity.

The inserting one selected from the group consisting of the first and second dental implements 100, 200 in the elongated cavity includes inserting at least a portion of the first elongated member 110, the spear 170 and the barb 180 of the first dental implement 100 in the elongated cavity. The manipulating of the handle body 306 of the dental apparatus 1000 includes rotating the handle 306 body to cause the barb 180 to rotate in the elongated cavity. For example, the handle 306 can be rotated clockwise or counterclockwise relative to the elongated cavity. The rotation of the barb 180 causing the barb 180 to engage the dental tissue or dental material in the elongated cavity.

Alternatively, the inserting one selected from the group consisting of the first and second dental implements 100, 200 in the elongated cavity includes inserting the second elongated member 220 of the second dental implement 200 in the elongated cavity. The manipulating of the handle body 306 of the dental apparatus 1000 includes rotating the handle body 306 to cause the plurality of nubs 230 to rotate in the elongated cavity. For example, the handle 306 can be rotated clockwise or counterclockwise relative to the elongated cavity. The rotation of the plurality of nubs 230 causes the second elongated member 230 of the second dental implement 200 with the nubs 230 to engage the dental tissue or dental material in the elongated cavity.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A dental apparatus, comprising:
a handle, the handle having a first end, a second end opposite to the first end, and a handle body extending between the first and second ends;
a first dental implement extending from the first end of the handle; and
a second dental implement extending from the second end of the handle, the second dental implement being different from the first dental implement,
wherein the first dental implement includes:
a first elongated member, the first elongated member having a first end connected to the first end of the handle, a second end opposite to the first end thereof, and a body extending between the first and second ends of the first elongated member;
a spear extending from the second end of the body of the first elongated member; and a barb connected to the body of the first elongated member, adjacent to the second end of the body of the first elongated member, and extending from the body of the first elongated member,
wherein the barb extends at an acute angle relative to the body of the first elongated member, and the barb extends at an obtuse angle relative to the spear,
wherein the second dental implement includes:
a first elongated member, the first elongated member of the second dental implement having a first end connected to the second end of the handle body, a second end opposite to the first end thereof, and a body extending between the first and second ends thereof;
a second elongated member connected to the first elongated member of the second dental implement, the second elongated member of the second dental implement having a first end connected to the second end of the first elongated member of the second dental implement, a second end opposite to the first end thereof, and a body extending between the first and second ends of the second elongated member of the second dental implement, wherein the body of the second elongated member of the second dental implement becomes narrower in a direction toward the second end thereof; and
a plurality of nubs protruding from an exterior of the body of the second elongated member of the second dental implement in a direction away from the second end of the body of the second elongated member of the second dental implement,
wherein the plurality of nubs is arranged along a path that spirals on the exterior of the body of the second elongated member of the second dental implement between the first and second ends thereof,
wherein the plurality of nubs have a blunt exterior periphery configured to reduce abrasion on an inner sidewall of an elongated cavity while still securely engaging dental tissue or dental material to be removed from the elongated cavity,
wherein a size of individual nubs included in the plurality of nubs decreases along the path that spirals on the exterior of the body of the second elongated member of the second dental implement in a direction toward the second end thereof,
wherein the plurality of nubs are backward facing such that the plurality of nubs are configured to point upward toward an outlet of the elongated cavity when inserted in the elongated cavity, and
wherein the plurality of nubs are elongated metallic structures.

2. The apparatus of claim 1, wherein the spear and the barb are connected to one another,
wherein a first portion of the spear is connected to a first portion of the barb, and
wherein an exterior of the first portion of the spear and an exterior of the first portion of the barb extend along a same imaginary line.

3. The apparatus of claim 1, wherein the body of the first elongated member includes a plurality of curved body portions and a plurality of straight body portions extending between the first and second ends of the first elongated member.

4. The apparatus of claim 3, wherein the plurality of curved body portions and the plurality of straight body portions are alternatively arranged with one another.

5. The apparatus of claim 3, wherein the plurality of curved body portions and the plurality of straight body portions include:

a first straight body portion, a second curved body portion, a third straight body portion, a fourth curved body portion and a fifth straight body portion sequentially arranged along a length of the first elongated member, wherein the first straight body portion extends between the second curved body portion and the first end of the handle, and wherein the fifth straight body portion extends between the spear and the fourth curved body portion.

6. The apparatus of claim 5, wherein the fifth straight body portion is directly connected to the spear.

7. The apparatus of claim 6, wherein a first imaginary axis extends in a length direction of the first straight body portion, a second imaginary axis extends in a length direction of the fifth straight body portion, and an angle formed between a portion of the first imaginary axis that extends on an inside of the first implement and a portion of the second imaginary axis that extends between an intersection of the first and second axes and the spear ranges from about 90 degrees to about 135 degrees.

8. The apparatus of claim 1, wherein the plurality of nubs have a triangular shape with a blunt edge or blunt corner.

9. The apparatus of claim 1, wherein the plurality of nubs protrude from an exterior of the body of the second elongated member of the second dental implement at an acute angle relative to said exterior in the direction away from the second end of the body of the second elongated member of the second dental implement.

10. The apparatus of claim 1, wherein an angle formed between the first elongated member and the second elongated member of the second dental implement ranges from about 90 degrees to about 135 degrees.

11. The apparatus of claim 1, wherein the body of the second elongated member of the second dental implement is conical.

12. The apparatus of claim 1, wherein the body of the first elongated member of the second dental implement is straight.

13. A dental apparatus, comprising:

a handle body;

a first dental implement extending from a first portion of the handle body; and a second dental implement extending from a second portion of the handle body, the second dental implement being different from the first dental implement, wherein the first dental implement includes:

a first elongated member connected to the first portion of the handle body, the first elongated member having a straight portion thereof distal to the first portion of the handle body;

a spear connected to the straight portion of a body of the first elongated member; and a barb connected to the straight portion of the body of the first elongated member;

wherein the second dental implement includes:

a first elongated member connected to the second portion of the handle body;

a second elongated member, the second elongated member of the second dental implement having a first end connected to the first elongated member of the second dental implement, a second end opposite to the first end thereof, and a body extending between the first and second ends thereof; and a plurality of nubs protruding from the body of the second elongated member and arranged along a coiling path on an exterior of the body of the second elongated member, between the first and second ends thereof, wherein the plurality of nubs have a blunt exterior periphery configured to reduce abrasion on an inner sidewall of an elongated cavity while still securely engaging dental tissue or dental material to be removed from the elongated cavity, wherein a size of individual nubs included in the plurality of nubs decreases along the path that coils on the exterior of the body of the second elongated member of the second dental implement in a direction toward the second end thereof, wherein the plurality of nubs are backward facing such that the plurality of nubs are configured to point upward toward an outlet of the elongated cavity when inserted in the elongated cavity, and wherein the plurality of nubs are elongated metallic structures.

14. The apparatus of claim 13, wherein at least one nub of the plurality of nubs has a blunt edge, and wherein the at least one nub of the plurality of plurality of nubs protrudes from an exterior of the body of the second elongated member of the second dental implement at an angle that is greater than about 0 degrees to about 90 degrees relative to the exterior of the body of the second elongated member of the second dental implement in the direction away from the second end of the body of the second elongated member of the second dental implement.

15. A method of performing a dental procedure, the method comprising:

obtaining a dental apparatus, the dental apparatus having a handle body, a first dental implement extending from a first portion of the handle body, and a second dental implement extending from a second portion of the handle body;

inserting one selected from the group consisting of the first and second dental implements in an elongated cavity, the elongated cavity extending inside of a natural or prosthetic tooth located in a mouth of a dental patient;

manipulating the handle body of the dental apparatus to cause the selected one from the group consisting of the first and second dental implements to engage with dental tissue or dental material present in the elongated cavity; and retrieving the selected one from the group consisting of the first and second dental implements, engaged with the dental tissue or dental material, from the elongated cavity;

wherein the second dental implement includes:

a first elongated member connected to the second portion of the handle body;

a second elongated member, the second elongated member of the second dental implement having a first end connected to the first elongated member of the second dental implement, a second end opposite to the first end thereof, and a body extending between the first and second ends thereof; and a plurality of nubs protruding from the body of the second elongated member and arranged along a coiling path on an exterior of the body of the second elongated member, between the first and second ends thereof, wherein the inserting one selected from the group consisting of the first and second dental implements in the elongated cavity includes inserting the second elongated member of the second dental implement in the elongated cavity, wherein the manipulating the handle body of the dental apparatus includes rotating the handle body to cause the plurality of nubs to rotate in the elongated cavity, the rotation of the plurality of nubs causing the second elongated member of the second dental implement to engage the dental tissue or dental material in the elongated cavity, wherein the plurality of nubs have a blunt exterior periphery configured to reduce abrasion on an inner sidewall of the elongated cavity while still securely engaging dental tissue or dental material to be removed from the elongated cavity, wherein a size of individual nubs included in the plurality of nubs decreases along the path that coils on the exterior of the body of the second elongated member of the second dental implement in a direction toward the second end thereof, wherein the plurality of nubs are backward facing such that the plurality of nubs are configured to point upward toward an outlet of the elongated cavity when inserted in the elongated cavity, and wherein the plurality of nubs are elongated metallic structures.

16. The method of claim 15, wherein the first dental implement includes:

a first elongated member connected to the first portion of the handle body, the first elongated member having a straight portion thereof distal to the first portion of the handle body;

a spear connected to the straight portion of the body of the first elongated member; and a barb connected to the straight portion of the body of the first elongated member, wherein the inserting one selected from the group consisting of the first and second dental implements in the elongated cavity includes inserting at least a portion of the first elongated member, the spear and the barb of the first dental implement in the elongated cavity, and wherein the manipulating the handle body of the dental apparatus includes rotating the handle body to cause the barb to rotate in the elongated cavity, the rotation of the barb causing the barb to engage the dental tissue or dental material in the elongated cavity.

* * * * *